United States Patent [19]

Kis

[11] Patent Number: 4,699,276
[45] Date of Patent: Oct. 13, 1987

[54] CHAIN-TYPE TOOL STORAGE MAGAZINE

[75] Inventor: Charles J. Kis, Mukwonago, Wis.

[73] Assignee: Kearney & Trecker Corporation, West Allis, Wis.

[21] Appl. No.: 891,160

[22] Filed: Jul. 31, 1986

[51] Int. Cl.$^4$ .......................... B23Q 3/157; A47F 7/00
[52] U.S. Cl. ........................................ 211/1.5; 29/568
[58] Field of Search .................. 211/1.5, 70.6; 29/568

[56] References Cited

U.S. PATENT DOCUMENTS

| | | | |
|---|---|---|---|
| 3,389,804 | 6/1968 | Lyon | 211/1.5 |
| 3,817,391 | 6/1974 | Lohneis et al. | 211/1.5 |
| 3,823,466 | 7/1974 | Jerue | 29/568 |
| 4,505,020 | 3/1985 | Kinoshita | 29/568 |
| 4,541,533 | 9/1985 | Uemura | 29/568 X |

Primary Examiner—Robert W. Gibson, Jr.
Attorney, Agent, or Firm—James O. Skarsten

[57] ABSTRACT

A magarize (10) for a machine tool (not shown) comprises a number of links (12) joined together by pins (14) to form a closed chain (16). A socket (32) is formed in each link for receiving a tool (34) to position the tool center line (36) midway between and in parallel relation with, the axes (40) of the two pins (14) which join the link to adjacent links in the chain (16). A frame (18) supports the chain (16) and received tools (34) for movement along a path of travel to selectively position the tools, the path including sections (26) of little or no curvature, and sections (28, 30) of substantial curvature. To maintain tool movement precisely along the path of travel, and thus prevent contact between tools in adjacent links (12) when the adjacent links travel around a section (28, 30) of substantial curvature, guide bearings (54) are joined to the links and constrained to move along a channel (56) which is in parallel relation with the desired chain path of travel.

12 Claims, 6 Drawing Figures

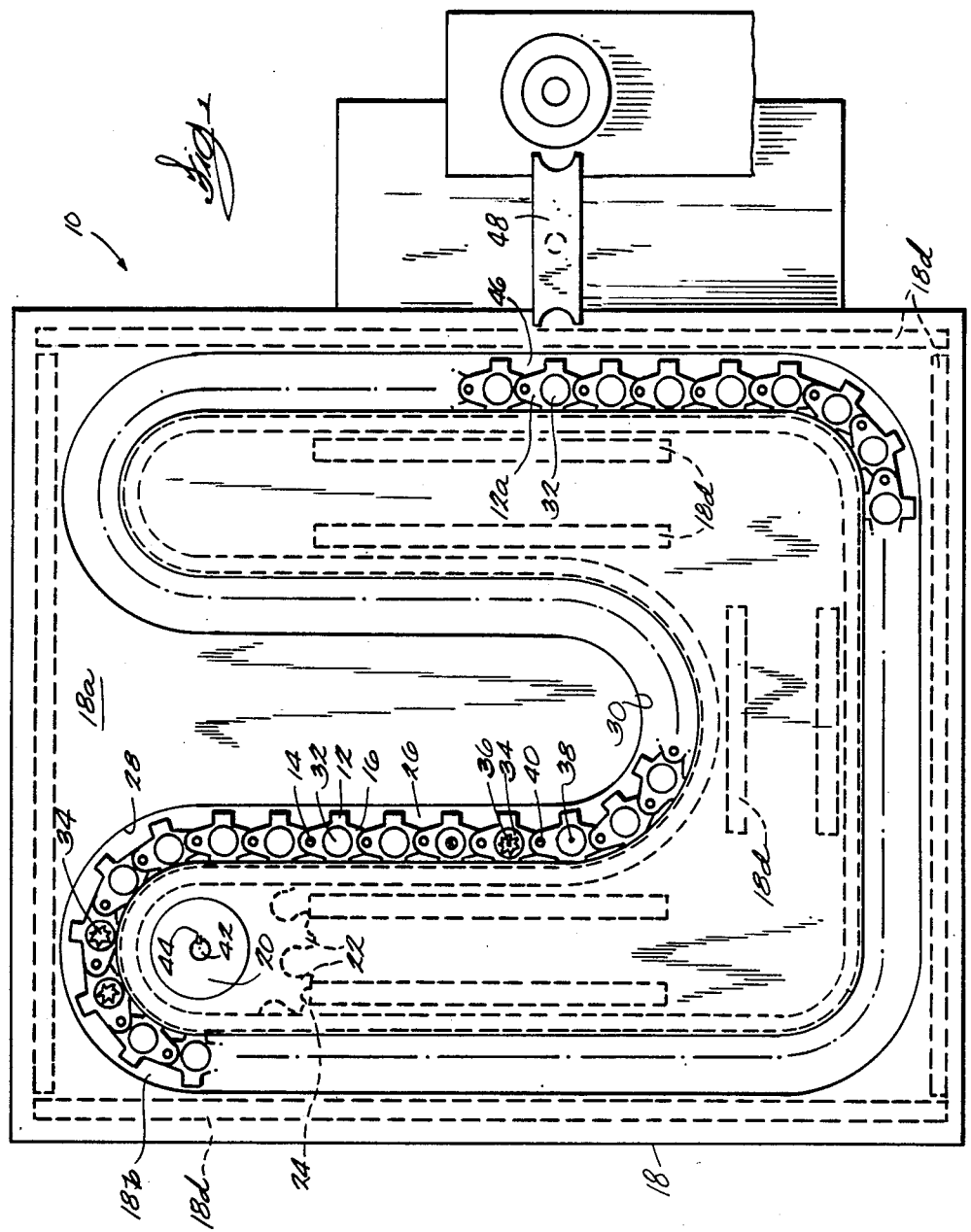

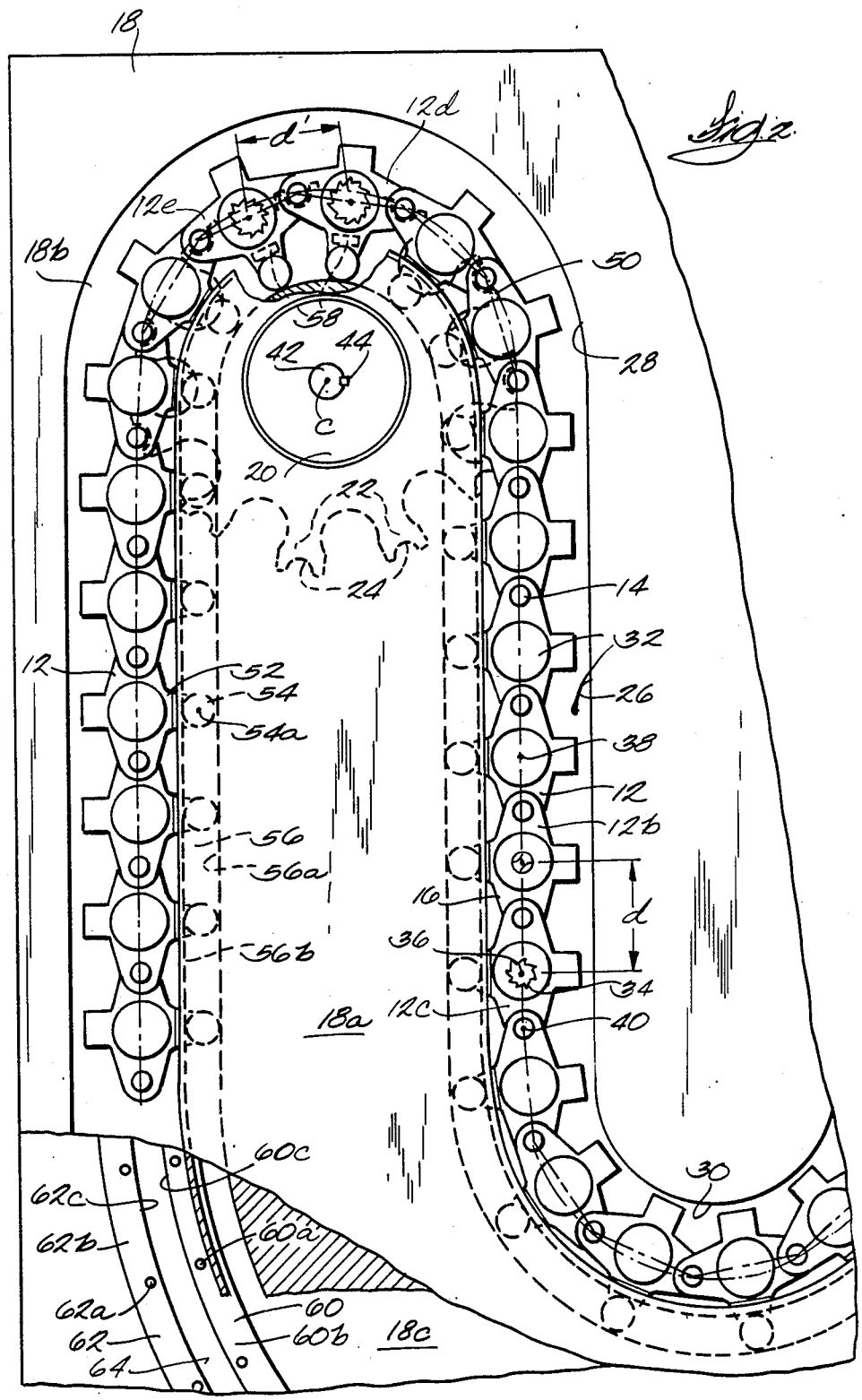

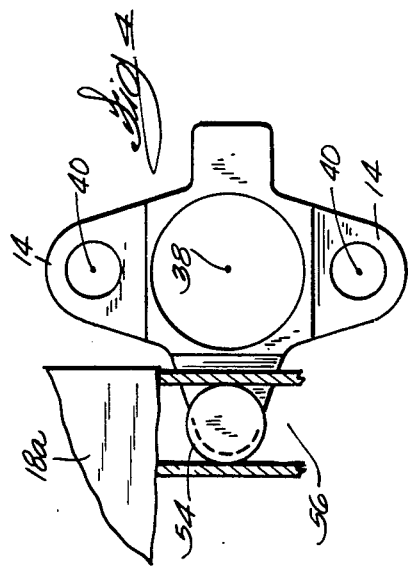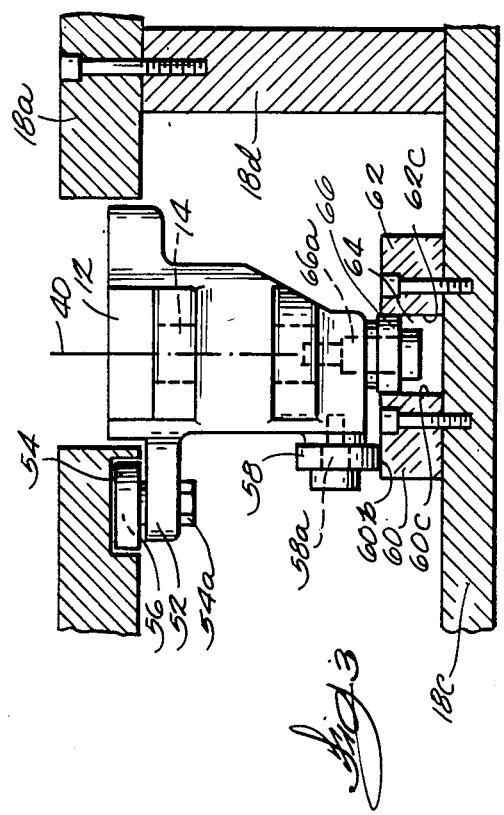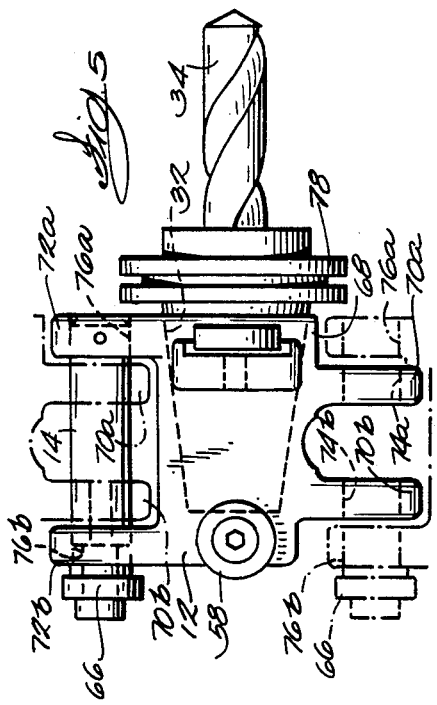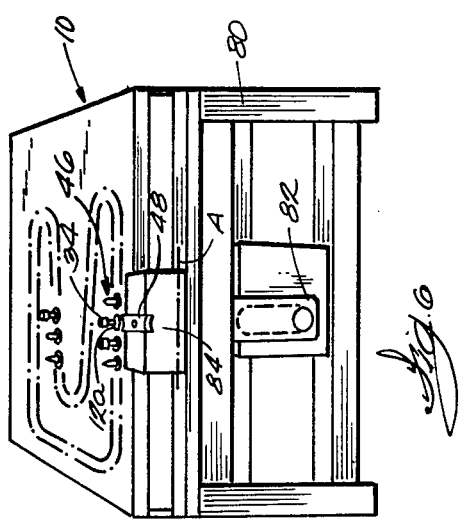

CHAIN-TYPE TOOL STORAGE MAGAZINE

BACKGROUND OF THE INVENTION

The invention pertains to a chain-type tool storage magazine for a machine tool, wherein a chain included in the magazine is selectively driven to position cutting tools for use by the machine tool.

In tool storage magazines of the above type, links are joined together by means of pins or other connecting elements to form a closed chain. The chain is mounted for movement along a path of travel which typically includes both straight sections and curved sections or turns, and cutting tools are attached at various positions around the chain for movement therewith. The chain is driven by a powered sprocket or other means to position selected tools in operative relationship with a machine tool.

In every common configuration of chain-type tool storage magazines, tools are mounted to one side of the chain by various means, in spaced apart relationship. The spacing between the center lines of adjacent tools mounted on the chain is referred to as "pitch". The pitch between the adjacent tools remains at a substantially constant value as the adjacent tools move along a straight section of the chain path of travel. However, the pitch between the adjacent tools will either increase or decrease as the tools are moved around a turn. A turn in the chain path of travel is referred to as an "outside turn" if the tool pitch increases, and is referred to as an "inside turn" if tool pitch decreases. Clearly, no difficulty is encountered in moving tools mounted to a side of a chain around an outside turn, since the tools move apart from one another. However, if tools are moved around an inside turn, adjacent tools move toward one another and may even clash together. To prevent this, chain-type tool magazines are frequently designed so that the chain path of travel includes outside turns only. This arrangement is exemplified by U.S. Pat. No. 3,817,391, issued June 18, 1974 for a "Tool Storage Magazine".

In a chain-type tool storage magazine having only outside turns, the chain necessarily surrounds a comparatively large amount of space which is not available for tool storage. To increase the tool storage or "tool packing" density of chain-type magazines, and thus avoid loss of valuable space close to an associated machine tool, "serpentine" configurations are employed. In such configurations, the chain is bent back and forth around a number of turns, to fill up as much space as possible. Tools are carried in sockets formed in the pins or other link connecting elements of the chain, since the pitch between adjacent link connecting elements does not change along the entire path of travel, regardless of whether the elements are moving along a straight path section or around a turn. Thus, the pitch between adjacent tools likewise remains constant over the path of travel. It will be noted that the turns in such configuration are neither outside nor inside turns, as defined above.

The above serpentine configuration improves tool packing density over other chain-type magazines of the prior art, but requires that the chain connecting elements be comparatively large or bulky. This constraint tends to result in a chain which is large and heavy, so that substantial power is required to drive the chain to selectively position tools carried thereby. The large size of the chain also increases wear and manufacturing costs, and adversely affects the speed at which the chain can be driven to selectively position a tool.

BRIEF SUMMARY OF THE INVENTION

In the invention, a chain-type tool storage magazine is provided which includes a number of links joined together by means of connecting elements to form a chain, the chain being mounted for movement along a path of travel to selectively position tools with respect to an associated machining center or other machine tool. The chain path of travel includes first and second sections, the first section comprising a curved section or turn, and the second section comprising a straight section or other section having a curvature which is substantially less than the curvature of the first section. Tools are supported by the links such that the pitch or spacing between the center lines of two adjacent tools does not become less than a specified minimum value when the adjacent tools are carried along the second section, but does become less than the specified value when the adjacent tools are carried along the first section. That is, the first section comprises an inside turn, in accordance with the previously stated definition.

Preferably, the path of travel includes a number of turns, as required to provide a chain path having the above serpentine configuration and thus optimize the tool packing density of the magainze. Also, a guiding structure is provided to resist lateral forces applied to the chain as it is moved around turns, so that chain movement follows a precise, predetermined path of travel.

An important advantage of the invention lies in providing a chain-type tool storage magazine for a machine tool wherein the path of travel of the chain includes inside turns, to maximize tool storage density. At the same time, the invention eliminates the need to carry tools in sockets formed in link connecting elements, and thereby eliminates the minimum size requirement imposed upon the connecting elements by the prior art as referred to herein.

Another advantage lies in providing a chain-type tool storage magazine of substantially increased capacity, without a corresponding increase in the time required to move a tool from one position in the magazine to another.

Another advantage lies in substantially reducing the power required to drive a chain to selectively position tools carried thereby.

Another advantage lies in simplifying a chain-type tool storage magazine by forming the links of the chain to carry tools, without the need to attach other tool supporting structure to the links.

Another advantage is the substantial reduction of wear in chain-type tool storage magazines.

Another advantage lies in maintaining a precise path of travel for tools in a chain-type magazine.

Another advantage lies in simplifying the fabrication of guiding structure for a chain-type magazine.

These and other advantages will become more readily apparent from the ensuing detailed description of the preferred embodiment, taken together with the drawings.

BRIEF DESCRIPTION OF THE DRAWINGS

FIG. 1 is a top plan view showing a tool storage magazine according to the invention.

FIG. 2 is a sectioned top plan view of a portion of the magazine shown in FIG. 1.

FIG. 3 is an end view showing a link of the magazine of FIGS. 1 and 2.

FIG. 4 is a a top plan view of a link of the magazine of FIGS. 1 and 2.

FIG. 5 is a side view showing adjacent links of the magazine of FIGS. 1 and 2.

FIG. 6 shows the magazine of FIGS. 1 and 2 in association with a machine tool.

DESCRIPTION OF THE PREFERRED EMBODIMENT

FIG. 1 shows a tool storage magazine 10 comprising a number of links 12 joined together by means of link pins 14 (or other linking elements) to form a closed chain 16; a frame 18 supporting the chain for movement along a path of travel, and a drive means such as a powered sprocket 20. Usefully, sprocket 20 is provided with teeth 22 having notches 24, the notches 24 being sized to engage respective link pins 14 to move the chain along its path of travel. Frame 18 is structured to provide a path of travel which includes sections having little or no curvature such as straight section 26, and further includes inside turn sections of substantial curvature, such as inside turns 28 and 30, as required to provide chain 16 with the serpentine configuration described above to maximize tool packing density. Preferably, all turns or curved sections comprise circular segments, to simplify fabrication of frame 18.

Each of the links 12 is provided with a socket 32 for receiving a tool 34, comprising a cutter or cutting tool for a machine tool. Each of the sockets 32 is shaped to match the tang end of a tool 34 or, more commonly, a toolholder supporting a tool 34, such that the axis or centerline 36 of a tool 34 received into a socket 32 is firmly aligned along the socket axis 38 of the socket. Each socket 32 is formed in a link 12 to position the socket axis 38 midway between the axes 40 of the pins 14 of the link. The socket axis 38 is thus also oriented in parallel relationship with such pin axes 40. Each socket 32 is configured in a chain link 12 to firmly support a tool 34 received thereinto, without the need to attach any additional structure to the chain. Thus, the links 12 of the magazine 10 function as, or are integral with, the tool carrying members of the magazine 10.

FIG. 1 further shows sprocket 20 tied to a rotatable shaft 42, such as by means of a key 44, shaft 42 being rotatably driven by a motor or other actuator (not shown). Preferably, the motor or other actuator is operated by a control such as a conventional computer numerical machine tool control (not shown) which actuates the motor to drive sprocket 20 such that a particular link 12 of chain 16 is moved to a tool change position 46, located proximate to a conventional automatic tool change arm 48. In response to commands received from the numerical machine tool control, arm 48 is manipulated to remove a tool 34 from the socket of a link 12a located at the position 46, or to place a tool into such socket.

FIG. 2 shows chain 16 provided with a pitch line 50, which is defined by the path of movement of the axes of respective link pins 14. As is known in the art, the spacing between two points located on the pitch line of a chain remains constant, regardless of whether the points are located on a straight or curved portion of the pitch line. Because of the above-stated relationship between socket axes 38 and link pin axes 40, the socket axis 38 of a link 12 lies on the pitch line 50 when the link is moving along a straight section of the chain path of travel, such as section 26. However, when the link moves around an inside turn, such as section 28 or 30, the socket axis 38 migrates inwardly from the pitch line 50 i.e., moves to the same side of the pitch line as the geometric center C of the turn. Thus, the pitch or spacing between the center lines 36 of tools 34 respectively carried by adjacent links such as 12b and 12c, moving along straight section 26 of the path of travel, is a value d. On the other hand, the pitch between the centerlines of tools 34 respectively carried by adjacent links such as 12d and 12e, moving around inside turn 28, is a value d', where d' is less than d. It will therefore be seen that the tools 34 carried in adjacent links 12 move toward one another when the adjacent links move around an inside turn.

If the maximum radii of tools to be stored and moved in magazine 10 are known, design parameters may be nominally selected to avoid contact between adjacent tools carried around an inside turn such as by links 12d and 12e. However, when a sprocket is employed to drive a chain around an inside turn, the teeth of the sprocket, in engaging respective links of the chain, generally cause the engaged links to continually move inward and outward, relative to the geometric center of the turn, as they move around the turn. This action, referred to as "chordal action", tends to be unpredictable and thus may significantly complicate the process of designing an inside turn in a chain magazine, to insure that adjacent tools do not collide when going around the turn.

To avoid any uncertainty in the movement of tools 34, and particularly to avoid uncertainties associated with tool movement around sproket 20, each of the links 12 is provided with a side member 52 which supports an upper guide roller or roller bearing 54, each roller 54 being rotatably joined to its corresponding side member 52 such as by means of a pin 54a. Each of the rollers 54 is constrained to move along a channel 56, having sides 56a and 56b which is usefully machined in the lower side of an upper plate member 18a of frame 18, in parallel relation with an opening 18b formed through the plate 18a and generally defining the chain path of travel. Rollers 54 function to precisely guide the chain around its path, and interaction between the rollers 54 and channel walls 56a and 56b take up any forces acting on links 12 transverse to the path direction. Thus, the rollers 54 prevent the spacing between tools 34 carried by two different links 12 from becoming less that a known value, pre-selected to avoid contact between tools, when one or both tools are moving around an inside turn. Uncertainties in tool movement, such as those arising from the chordal action referred to above are thereby eliminated in the operation of chain 16.

Chordal action in magazine 10 is further diminished by configuring sprocket 20 with teeth 22 and notches 24, described above. Sprocket 20 thus contacts only the link pins 14, to transmit driving power to chain 16, and does not come into contact with any of the links 12. Since the link pins move along the pitch line of chain 16, as previously stated, interaction between the sprocket 20 and the link pins 14 does not disturb the motion of chain 16 to any significant degree. Also, the arrangement shown in FIG. 2 achieves a significant reduction in rotary inertia of tools moving around the turn. This is particularly important if large or heavy tools are to be moved and stored in chain 16.

It will be seen that power to drive chain 16 is applied successively to the links 12 by the sprocket 20 as the links move around the chain path of travel, and that driving power is transmitted through each of the links. This is in contrast to a common prior art arrangement in which tool carring members are joined to and driven by a carrier chain which engages a sproket. As an alternative to the sprocket drive, rack teeth could be formed in the links 12, whereby the chain would be drive along its path of travel by a powered gear or other rack drive member positioned to engage the rack teeth of successive links 12.

FIG. 2 further shows links 12 provided with link carrying rollers or roller bearings 58. Rollers 58 are provided to support links 12 and tools carried thereby, as hereinafter described, to nearly eliminate friction associated with movement of chain 16. FIG. 2 also shows rail members 60 and 62 joined to a lower plate 18c of frame 18 in spaced-apart relationship, such as by bolts 60a and 62a, respectively. Rail members 60 and 62 are respectively provided with flat upper surfaces 60b and 62b. Members 60 and 62 also are respectively provided with sides 60c and 62c, which are spaced apart from each other in opposing relationship to form a channel 64, following the path of travel of chain 16 beneath the links 12.

FIG. 3 shows the roller bearings 58 of a link 12 supported for movement along upper surface 60b of rail member 60, as chain 16 is moved in its path of travel, roller 58 being joined to the link 12 such as by a pin 58a. FIG. 3 further shows a lower guide roller or roller bearing 66 joined to a link pin 14, such as by a pin 66a, for rotation around the link pin axis 40. Each link 14 of the chain 16 is provided with a roller bearing 66, as shown in FIG. 3, all of the roller bearings 66 being located in and constrained to move along the channel 64. The roller bearings 66 act against the channel walls 60c and 62c to take up any forces applied to the links of chain 16 which are transverse to the chain path of travel, in like manner as the upper guide roller bearings 54. The lower guide bearings 66 and upper guide bearings 54 also act against the walls of their respective channels 56 and 64 in cooperation, to take up moments applied to the links 12 transverse to the chain path of travel.

FIG. 3 further shows the plate members 18a and 18c spaced apart by means of a wall member 18d of frame 18.

It will be seen that all the links 12 and pins 14 of chain 16, as well as tools carried thereby, are supported by frame 18 only through roller bearings 54, 58 or 66. It has been found that movement of chain 16 has thereby been made very smooth, and requires substantially less driving power than other tool storage chains of the prior art.

FIG. 4 shows the axis 38 of a link 12 positioned midway between the axes 40 of the link pins 14 which join the link to its adjacent links in the chain 16, as previously described.

FIG. 5 shows a link 12 having a body portion 68, in which a tool socket 32 is formed. FIG. 5 further shows a link provided with spaced-apart members 70a and 70b, projecting outward from one end of the body portion 68, and also with spaced-apart members 72a and 72b, projecting outward from the opposing end of the body portion 68. Link pin holes 74a and 74b are respectively formed through each of the members 70a and 70b, in axial alignment with one another. In like manner, link pin holes 76a and 76b are respectively formed through each of the end members 72a and 72b in axial alignment with one another. Preferably, the link pin holes 74a and b and 76 a and b of all of the links 12 are of identical size. FIG. 5 shows the spacing between the end members 72a and 72b of a link 12 to be sufficiently large to receive the end members 70a and 70b of an adjacent link, so that all of the associated link pin holes 74a and b and 76a and b of such end members can be positioned in axial alignment with one another. A link pin 14 is passed through the aligned link pin holes to join the adjacent links together, in pivotal relationship with one another about the link pin. Thus, the end members 70a and 70b of each of the links 12 are mated with the end members 72a and 72b of an adjacent link, to form chain 16 as a closed chain.

FIG. 5 further shows a tool 34 retained in a socket 32 by means of a conventional tool holder 78.

FIG. 6 shows a machine tool 80, such as a machining center, proximate to the magazine 10 and having a horizontal spindle 82, and also a tool change arm carrier 84 supporting and manipulating tool change arm 48 in exchanging tools 34 between the spindle 82 and the socket 32 of link 12a at the tool change position 46, as described above.

Change arm 48 and tool change arm carrier 84 may be of conventional design and operation and are therefore not described in greater detail. The design and operation of such components could for example, be similar to those shown in U.S. Pat. No. 4,164,810 issued Aug. 21, 1979, for an "AUTOMATIC TOOL CHANGER FOR MACHINE TOOL". For such arrangement, the carrier 84 would be rotated about an axis, such as A, to move a tool engaged by arm 48 between spindle 82 and the tool change position 46.

FIG. 6 shows magazine 10 to have a generally horizontal orientation. However, it is anticipated that magazine 10 could alternatively be provided with a vertical orientation, or an orientation at any angle lying between horizontal and vertical orientations. If the magazine was in a vertical orientation, it would preferably be provided with means for preventing tools from inadvertently falling out of their respective sockets.

In a modification of the invention a plurality of sockets are formed in links 12, rather than just a single socket centered midway between the link pin axes. It is considered that this arrangement would be particularly advantageous in a magazine for storing tools of comparatively small size. Alternatively, a pallet for carring a number of tools of smaller size could be configured to be inserted into a socket 32 of a link 12 and carried thereby.

What is claimed is:

1. A tool storage magazine for a machine tool comprising a plurality of means for carrying tools to be used with the machine tool; means for connecting the tool carrying means together to form a chain; means for supporting the chain and tools for movement and for guiding their movement along a path of travel; and means for driving the chain along the path to selectively position a tool, wherein:

each of said tool carrying means comprises means for engaging a tool and first and second end members rigidly joined to the tool engaging means in opposing relationship with each other;

a first of said tool carrying means positioned in said chain between second and third tool carrying means has a first end member in lapped relationship with the second end member of the second tool carrying means, and a second end member in lapped relationship with the first end member of the third tool carrying means;

said connecting means includes means for joining the first and second tool carrying means in pivotal relationship about a common first axis extending through both the first end member of the first tool carrying means and the second end member of the second tool carrying means;

said connecting means further includes means for joining the first and third tool carrying means in pivotal relationship about a common second axis extending through both the second end member of the first tool carrying means and the first end member of the third tool carrying means; and said first and second axes and the axis of a tool carried by the first tool carrying means are fixed in substantially coplanar relationship with one another by the first tool carrying means.

2. The magazine of claim 1 wherein:

each of said tool carrying means has a plurality of said first and second end members; and the first end members of the first tool carrying means and the second end members of the second tool carrying means are respectively formed to fit together in conjugate relationship, and the second end members of the first tool carrying means and the first end members of the third tool carrying means are likewise respectively formed to fit together in conjugate relationship.

3. The magazine of claim 1 wherein:

said means for joining said first and second tool carrying means comprises a first link pin inserted into holes in aligned relationship formed in both the first end member of the first tool carrying means, and the second end member of the second tool carrying means, the first axis comprising the axis of the first link pin; and said means for joining said first and third tool carrying means comprises a second link pin inserted into holes in aligned relationship formed in both the second end member of the first tool carrying means, and the first end member of the third tool carrying means, the second axis comprising the axis of the second link pin.

4. The magazine of claim 1 wherein:

the tool engagement means of the first tool carrying means comprises a body member provided with a socket for receiving a tool and positioning the axis of the tool midway between said first and second axes.

5. The magazine of claim 4 wherein:

the tool engaging means and first and second end members of each of said tool carrying means comprises an integral link for said chain.

6. The magazine of claim 5 wherein:

said driving means comprises means for applying driving power to each of said links in succession, said driving power being transmitted through said links.

7. The magaizne of claim 5 wherein:

said connecting means comprises a plurality of link pins; and said links are respectively joined together by said pins to form a closed chain, each of said pins joining the first end member of a link to the second end member of an adjacent link in the chain.

8. The magazine of claim 7 wherein said driving means comprises:

a sprocket constructed to contact said link pins and to avoid contacting said links; and means for controllably rotating said sprocket.

9. The magazine of claim 1 wherein the path of travel includes a curved section, and the supporting and guiding means comprises:

a frame having a bearing surface lying along the path of travel;

first roller elements attached to each tool carrying means supporting the tool carrying means and tools for movement along the bearing surface with a negligible amount of friction; and second roller elements attached to each tool carrying means interacting with the fame to oppose forces transverse to the path of travel applied to links moving along the curved section to prevent the transverse forces from deflecting the links from the path of travel.

10. The magazine of claim 9 wherein:

the frame is constructed to support the tool carrying means and tools for movement along a path of travel having a serpentine configuration.

11. A tool storage magazine for a machine tool comprising:

a plurality of links, each link comprising a tool carrying member and first and second end members joined to the tool carrying member in opposing relationship with each other;

means for supporting said links and tools carried thereby for movement, and for guiding movement thereof along a path of travel, a selected link being positioned between first and second other links along said path of travel;

means for connecting said links together to form a chain, including means for directly connecting said selected link and said first link together in pivotal relationship about a first axis common to both said selected and first links, and for otherwise constraining said first and second links to move in unison, and further including means for directly connecting said selected link and said second link together in pivotal relationship about a second axis common to both said selected and second links, and for otherwise constraining said selected and second links to move in unison, the first axis, second axis and the axis of a tool carried by the selected link being fixed in substantially coplanar relationship; and means for driving the chain along the path to selectively position a tool.

12. The magazine of claim 11 wherein:

said connecting means includes a first link pin common to the first end member of the selected link and the second end member of the first link to join the selected and first links in pivotal relationship about the axis of the first pin, comprising said first axis said connecting means further including a second link pin common to the second end member of the selected link and the first end member of second link to join the selected and first links in pivotal relationship about the axis of the second pin, comprising said second axis.

* * * * *